United States Patent
New

[15] 3,697,838
[45] Oct. 10, 1972

[54] SPEED CONTROL SYSTEM FOR A LINEAR INDUCTION MOTOR

[72] Inventor: John D. New, Denham, Bucks, England

[73] Assignee: The Harefield Rubber Company Limited, Harefield, England

[22] Filed: June 5, 1970

[21] Appl. No.: 43,795

[30] Foreign Application Priority Data

June 6, 1969  Great Britain..........28,721/69

[52] U.S. Cl. ....................318/135, 318/243, 310/13, 49/360
[51] Int. Cl. ............................................H02k 41/02
[58] Field of Search............................310/12–14, 19, 310/191, 209, 190; 318/121, 135, 293, 360; 49/360, 31

[56] References Cited

UNITED STATES PATENTS

| | | |
|---|---|---|
| 3,385,228 | 5/1968 | Chung........................104/148 |
| 3,407,749 | 10/1968 | Frig.........................310/13 X |
| 3,462,883 | 8/1969 | Reeks et al. .............310/19 X |

Primary Examiner—D. F. Duggan
Attorney—Karl W. Flocks

[57] ABSTRACT

A linear induction motor particularly applicable for actuating a sliding door and having a speed control system comprising means for varying the air gap between the primary and secondary members during relative linear movement between the members.

11 Claims, 6 Drawing Figures

Inventor:
John Dominik New
By
Karl W. Flocks
Attorney

SPEED CONTROL SYSTEM FOR A LINEAR INDUCTION MOTOR

BACKGROUND OF THE INVENTION

The invention relates to a speed control system for a linear induction motor.

Previously, to control the relative speed of the primary and secondary members of a linear induction motor it has been necessary to control the supply of current to the primary member using complex and expensive electronic circuitry.

It is an object of the present invention to provide an improved speed control system for a linear induction motor.

SUMMARY OF THE INVENTION

According to the present invention there is provided a linear induction motor having a speed control system comprising means for varying the air gap between the primary and secondary members during relative linear movement between said members.

Preferably variation of the air gap between the two members is obtained by a wheel connected to one of the primary and secondary members and arranged during said relative movement to contact and be rotated by the other of the members or a part fixed to the other of the members, the wheel being rotatably and slidably mounted on a shaft inclined to the direction of relative linear movement, so as to make a first angle with said direction within the plane of linear movement, and to make a second angle with said plane such that as said members move relative to one another the wheel rotates due to the inclination at said first angle and moves along the shaft thereby causing the air gap to be varied by an amount determined by the second angle.

The invention has particular application to the controlled movement of sliding doors for which one of the members is mounted on the door and the other member is mounted adjacent to the door.

BRIEF DESCRIPTION OF THE DRAWINGS

In order that the present invention may be more fully understood an embodiment thereof will now be described, by way of example only, with reference to the drawings accompanying the provisional specification in which.

DESCRIPTION OF THE PREFERRED EMBODIMENT

Figure 3:
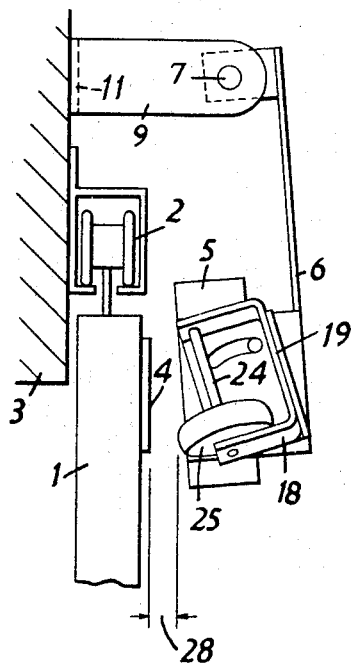
FIG. 3 shows a side view of the arrangement of FIG. 1 with the motor de-energized and FIGS. 4, 5 and 6 show views similar to that of FIG. 3 during different stages of operation.

Referring to the drawings, a sliding door unit comprises a door, part of which is shown at 1, carried by and movable along a track indicated generally at 2, the track being secured to a lintel 3. A strip 4 of low remanence magnetic material is mounted along the upper edge of one face of the door to constitute the secondary member of a linear induction motor, the primary member 5 of which is supported on a plate 6. The latter is pivoted about axes 7 and 8 parallel to the direction of linear movement by being pivotally secured near its upper end to supports 9 and 10 carried by a bracket 11 secured to the lintel 3. As shown in FIG. 3 the arrangement is such that in its static condition the primary member 5 hangs freely in register with but spaced from the strip 4. In practice this gap indicated at 28 may be of the order of one inch.

Figure 2:
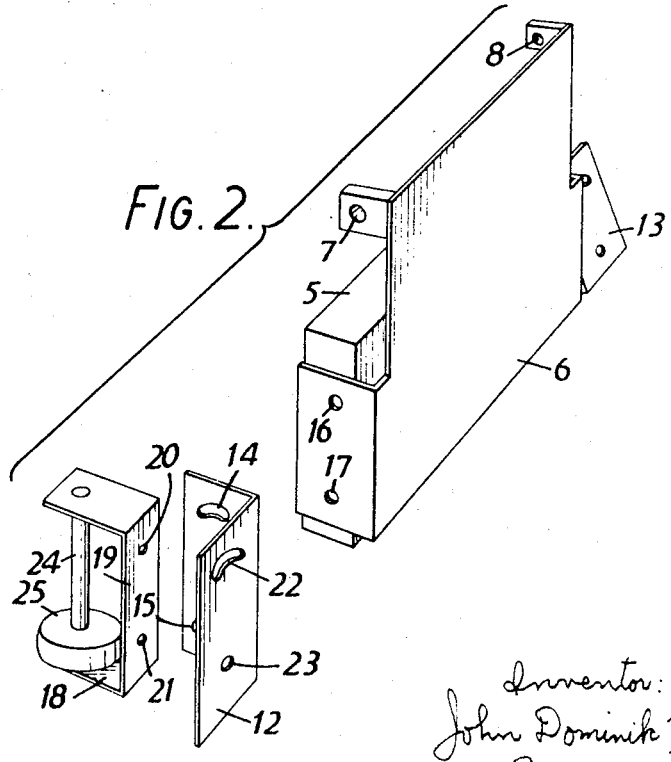
FIG. 2 shows a partially exploded view in perspective of part of the control system.

Referring now to FIG. 2 the primary member 5 carries at each of its ends L-shaped brackets 12 and 13 secured by bolts (not shown) passing through apertures such as 14 and 15 in one limb and into threaded holes such as 16 and 17 in the member 5. The bracket 12 carries a U-shaped support 18 in the bight 19 of which is apertured at 20 and 21 to be secured to the other limb of the bracket 12 by nut and bolt means (not shown) passing therethrough and through registering apertures 22 and 23 in the bracket. The support 18 carries a shaft 24 between its limbs and a wheel 25 is freely rotatable on the shaft. A similar wheel 26 is rotatable on a shaft 27 carried on a U-shaped support (not shown) secured to the bracket 13.

The apertures 14 and 22 in the bracket 12 (and the corresponding apertures in the bracket 13) are acuate so that the inclination of the shafts 24 and 27 may be varied both as regards the angles of the shafts to the direction of relative motion in the plane of relative motion of the members 4 and 5 and as regards the angles of the shafts to that plane.

Figure 4:
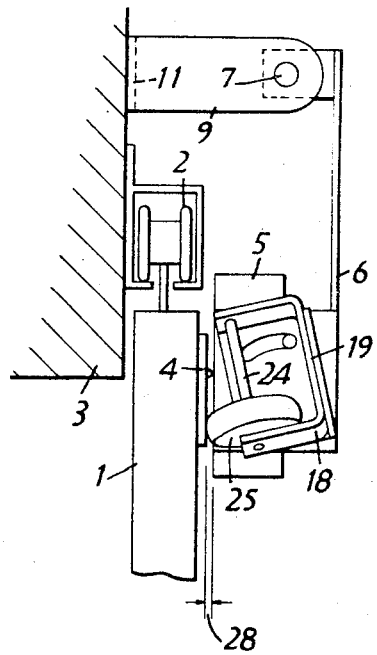

When the motor is energized the plate 6 and primary member 5 are pivoted down by electromagnetic attraction between the primary member and strip until the wheels contact the strip 4, FIG. 4; maximum thrust is exerted on the strip which moves causing the wheels to rotate.

Figure 1:
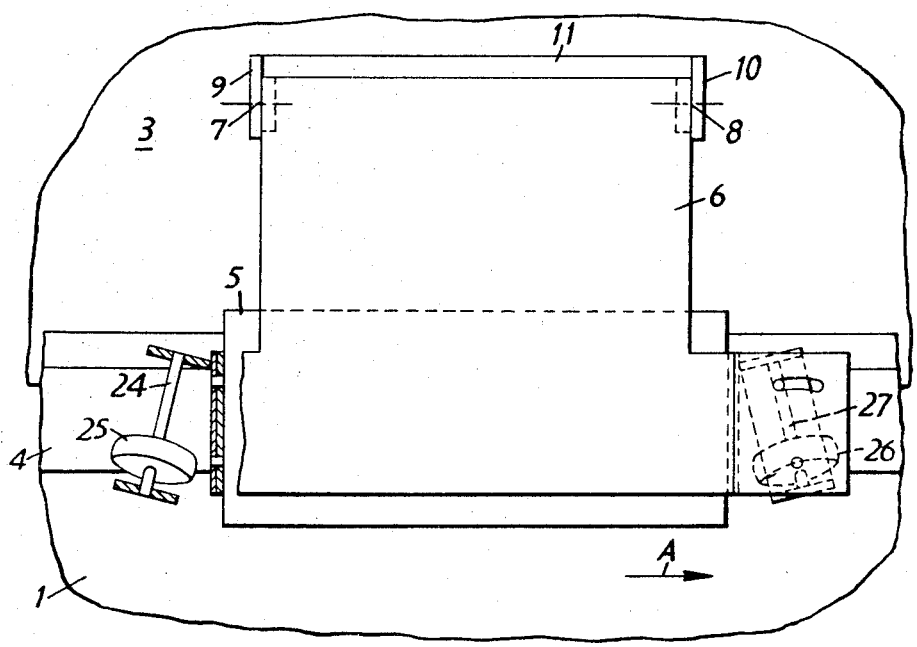
FIG. 1 is a front elevational view of part of a sliding door unit incorporating a linear motor controlled according to the invention and with parts cut away.
Figure 5:
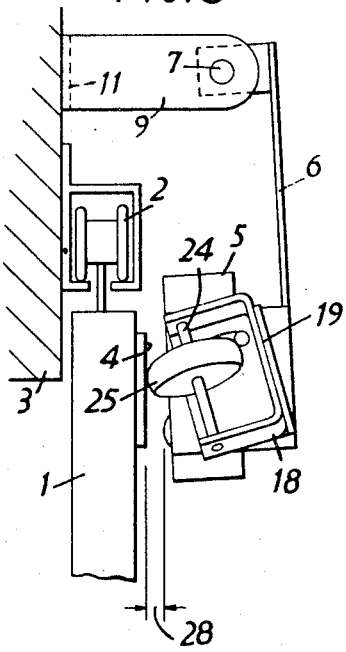
Figure 6:
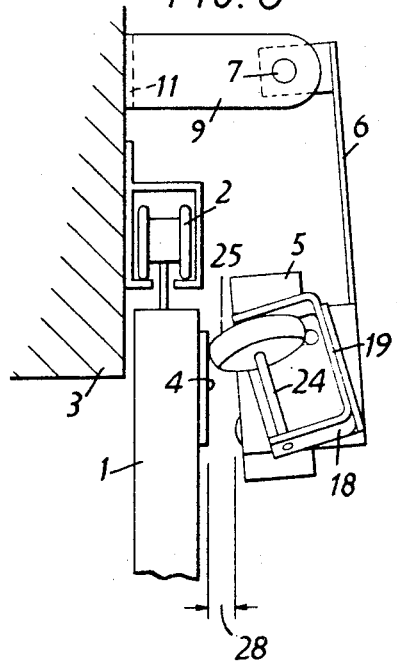

When the member 5 is energized in the sense to cause movement of the strip 4 in the direction of the arrow A (FIG. 1) the wheel 25, because of the inclination of the shaft 24 to the direction of travel of the strip in the plane of the strip, rides up the shaft (FIG. 5). This causes pivotal movement of the mounting plate 6 away from the strip 4, because of the inclination 7 the shaft to the plane of the strip; the consequential increase in the gap 28 between the strip and the primary member 5 reduces the attraction between the members and decreases speed of the strip. When the wheel reaches its uppermost position the speed of the strip is at its minimum (FIG. 6). Pivotal movement of the brackets 12 and 13 in directions normal to the plane of relative movement of the members is used to vary the maximum gap between the members and pivotal movement in the direction of relative movement varies the linear distance required to cause the wheels to ride completely along their shafts. Thus by appropriate combinations of adjustment the speed characteristic of the strip can be controlled. The strip and primary members may be arranged so that there is a clearance 28 of the order of one-tenth inch when the motor is energized initially, i.e. when the wheels are in their lowest positions.

In the reverse direction of the strip the wheel 26 will operate as described above to control the speed of the strip. In practice it has been found that by setting relatively different angles for the two sliding shafts the speed of operation of the door can, of course, be different for the opening and closing operations. The practical advantage of this is that the doors can open very quickly when admitting the traffic, but close quite slowly, therefore avoiding any possible danger of impacting vehicles or pedestrians at high speeds.

When the motor is de-energized the mounting plate 6 pivots away from the door (FIG. 3) to a rest position in which the wheels are no longer in contact with the strip 4 and fall to their lowest position.

The extent of travel of the door may be controlled by limit switches which cause de-energization of the motor when operated and may initiate timing devices which, after a preset time, reverse the motor to reverse the direction of travel of the door.

Various modifications of the above described system will be obvious, for example, the strip or secondary member may be arranged to be fixed and the primary member together with the wheels to be movable. The wheels need not contact the strip but can contact some part fixed relative to the strip.

The speed control system of the present invention readily enables the induction force with the wheels 25 and 26 in their high position to be the minimum required to keep the door moving. Should a person or vehicle be trapped by the moving door the latter will stop after only a light impact and without causing injury or damage. In addition no mechanical linkage is required between the power unit and the door panel so that manual operation is simple, for example, under emergency conditions with a power failure.

I claim:

1. A linear induction motor having a primary member, a secondary member, means for energizing the primary member to cause relative linear motion between the members, and a rotatable member carried by one of said primary and secondary members and arranged during said relative movement to contact a surface fixed relative to the other of the primary and secondary members to vary the air gap therebetween.

2. A motor according to claim 1 including mounting means for pivotally mounting one of the members so that it can pivot towards and away from the other of the members to decrease and increase the air gap.

3. A member according to claim 1 in which the air gap has a rest position value in the unenergised condition of the primary member and the rotatable member acts to increase the air gap from its rest position value in response to relative movement in both senses parallel to the linear direction.

4. A linear induction motor having a primary member, a secondary member, means for energizing the primary member to cause relative linear motion between the members and means for varying the air gap between the primary and secondary members at a first rate in response to relative movement in one sense and at a different rate in response to relative movement in the other sense.

5. A sliding door arranged to be actuated by a linear induction motor according to claim 1, one of the primary and secondary members being secured to the door.

6. A linear induction motor having a primary member, a secondary member, means for energizing the primary member to cause relative linear motion between the members, a wheel connected to one of the primary and secondary members and arranged during said relative movement to contact and be rotated by a surface fixed relative to the other of the members, the wheel being rotatably and slidably mounted on a shaft inclined to the direction of relative linear movement, so as to make a first angle with said direction within the plane of linear movement, and to make a second angle with said plane, such that as said members move relative to one another the wheel rotates due to the inclination at said first angle and moves along the shaft thereby causing the air gap between the primary and secondary members to be varied by an amount determined by the second angle.

7. A motor according to claim 6 in which the shaft is mounted so that the first angle is adjustable.

8. A motor according to claim 7 in which the shaft is mounted so that the second angle is adjustable.

9. A motor according to claim 6 including a second wheel similarly mounted on a further shaft inclined to the linear direction so that the first angle is in the opposite sense to that of the first shaft but the second angle is in the same sense.

10. A motor according to claim 9 in which the second angles defined by the first and second shafts are different.

11. A linear induction motor according to claim 1 in which the one of the primary and secondary members which is movable towards and away from the other of the members is arranged in its rest position to be spaced from the other of the members.

* * * * *